(12) United States Patent
Mufti et al.

(10) Patent No.: US 12,227,186 B2
(45) Date of Patent: Feb. 18, 2025

(54) INTERACTION AUTO-LABELING USING SPATIAL OVERLAP OF TRACK FOOTPRINTS FOR MINING INTERACTIONS

(71) Applicant: GM Cruise Holdings LLC, San Francisco, CA (US)

(72) Inventors: Adeel Mufti, San Francisco, CA (US); Prathyush Katukojwala, Pasadena, CA (US); Na Yu, San Jose, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 470 days.

(21) Appl. No.: 17/556,513

(22) Filed: Dec. 20, 2021

(65) Prior Publication Data

US 2023/0192092 A1 Jun. 22, 2023

(51) Int. Cl.
| | |
|---|---|
| *G06N 20/00* | (2019.01) |
| *B60W 30/18* | (2012.01) |
| *G06V 10/62* | (2022.01) |
| *G06V 20/56* | (2022.01) |

(52) U.S. Cl.
CPC ....... *B60W 30/18163* (2013.01); *G06N 20/00* (2019.01); *G06V 10/62* (2022.01); *G06V 20/588* (2022.01); *B60W 2520/06* (2013.01)

(58) Field of Classification Search
None
See application file for complete search history.

(56) References Cited

U.S. PATENT DOCUMENTS

| | | | |
|---|---|---|---|
| 11,798,407 B1 * | 10/2023 | Wang | G08G 1/017 |
| 2018/0077538 A1 * | 3/2018 | Matus | G08B 25/016 |
| 2019/0265712 A1 * | 8/2019 | Satzoda | B60W 40/09 |
| 2021/0370921 A1 * | 12/2021 | Silva | B60W 30/0956 |
| 2022/0161830 A1 * | 5/2022 | Devassy | B60W 50/0097 |

OTHER PUBLICATIONS

Ettinger S., et al., "Large Scale Interactive Motion Forecasting for Autonomous Driving: The Waymo Open Motion Dataset," Computer Vision and Pattern Recognition, Apr. 20, 2021, arXiv: 2104.10133v1 [cs.CV], 15 Pages.

* cited by examiner

*Primary Examiner* — Peter D Nolan
*Assistant Examiner* — Jacob Kent Besteman-Street
(74) *Attorney, Agent, or Firm* — Michael DiCato

(57) ABSTRACT

Apparatus and methods of the present disclosure provide a solution to quickly sort through and identify relevant data sets from large amounts of data collected by numerous vehicles. This process is a form of data mining where a processor executes instructions out of a memory to evaluate sensor data collected by vehicles over time. These vehicles may be driven by person's such that data collected by those sensors would be representative of how a person drives. After data has been acquired, it may be evaluated to identify portions of data where one vehicle encounters another vehicle along a roadway. Data may be classified as being associated with particular types of driving maneuvers and organized into data sets with labels consistent with the classification or driving maneuver. Classifications could correspond to different typed of driving maneuvers, "turning left across traffic," "all way stop," "merging onto a highway," or "lane change".

20 Claims, 6 Drawing Sheets

INTERACTION AUTO-LABELING USING SPATIAL OVERLAP OF TRACK FOOTPRINTS FOR MINING INTERACTIONS

BACKGROUND

1. Technical Field

The present disclosure is generally related to evaluating and classifying data. More specifically, the present disclosure is directed to solutions for finding sensor data associated with specific types of vehicle encounters.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, and radar elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

One problem associated with autonomous vehicles (AVs) is that AV controllers have a limited ability to act appropriately when certain types of driving maneuvers are performed. For example, an AV controller may not properly perform tasks necessary to execute a left turn maneuver when operating in high-speed traffic conditions. For example, the controller may not adequately time when to make a left turn when a stream of vehicles are driving along the path across which the AV must turn left. If provided with enough relevant data, a machine learning process may learn from data collected by vehicles over time such that operation of a controller of an automated vehicle can be improved.

Apparatus and methods of the present disclosure provide a solution to quickly sort through and identify relevant data sets from large amounts of data collected by numerous vehicles. This process is a form of data mining where a processor executes instructions out of a memory to evaluate sensor data collected by vehicles over time. These vehicles may be driven by person's such that data collected by those sensors would be representative of how a person drives. After data has been acquired, it may be evaluated to identify portions of data where one vehicle encounters another vehicle along a roadway. Data may be classified as being associated with particular types of driving maneuvers and organized into data sets with labels consistent with the classification or driving maneuver. Classifications could correspond to different typed of driving maneuvers, "turning left across traffic," "all way stop," "merging onto a highway," or "lane change," for example.

Figure 1:
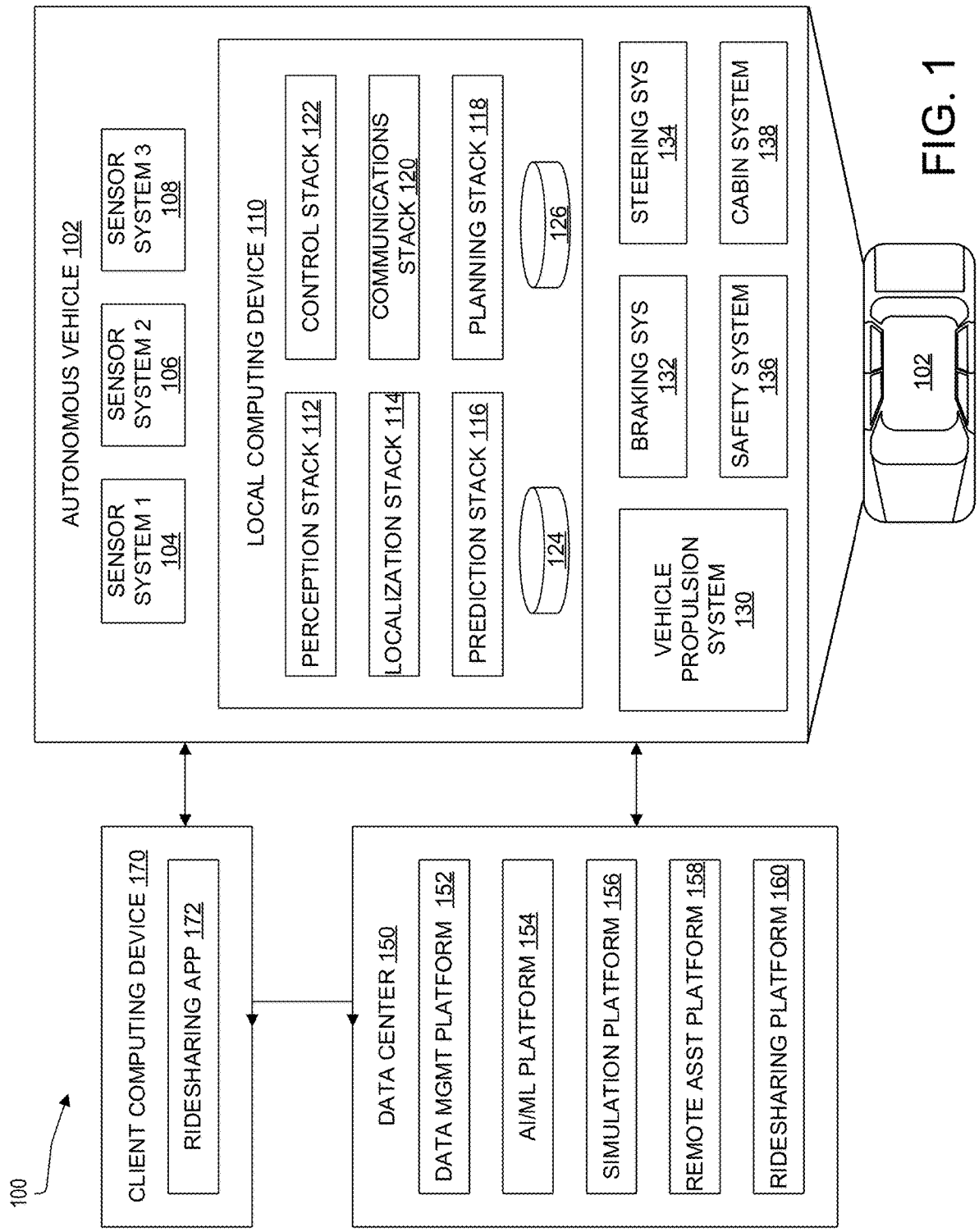
FIG. 1 illustrates an example of a system for managing one or more Autonomous Vehicles (AV), in accordance with some aspects of the present technology.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

If you train both of these tasks jointly, they can help each other add multiple tasks to a neural network specific to the task you are trying to solve can improve overall performance. Do multiple things and be used in multiple ways down-stream and improve training via multi-task learning framework.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2A:
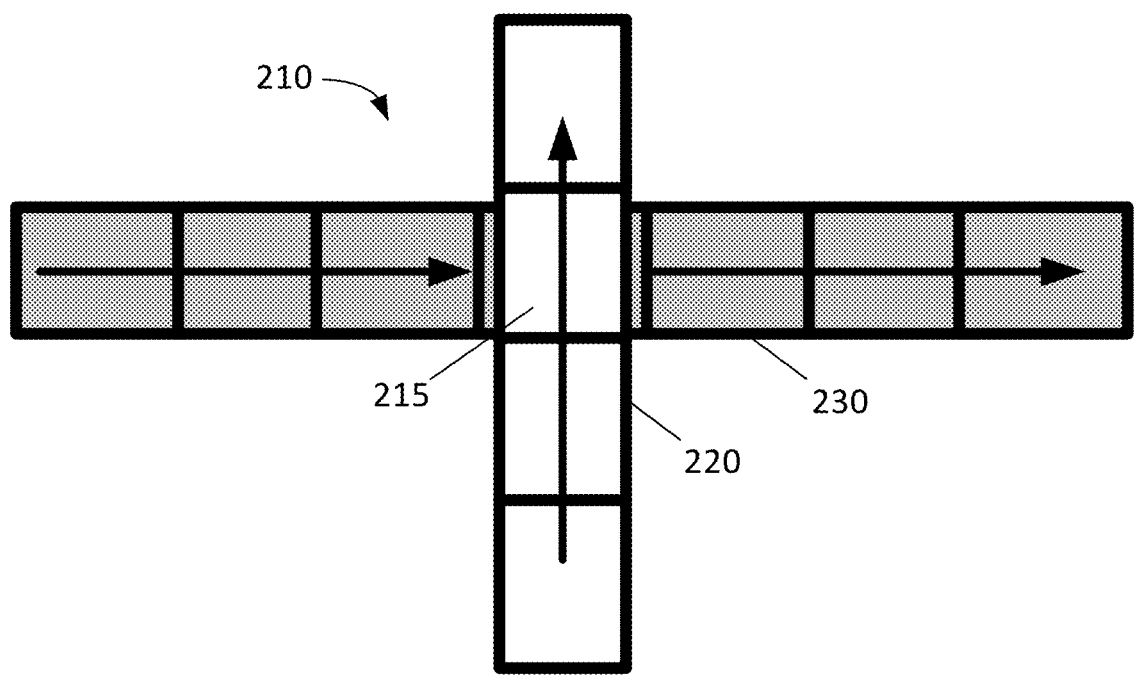
FIG. 2A illustrates a first track associated with a first type of vehicle interaction, in accordance with some aspects of the present technology.

FIG. 2A illustrates a first track associated with a first type of vehicle interaction. FIG. 2A includes a first interaction 210 where a first 220 track of a first vehicle crosses a second track 230 of a second vehicle at point of intersection 215. This first interaction 210 is a cross-traffic interaction, where the first vehicle moves in a direction that is perpendicular to motion of the second vehicle. The tracks 220 and 230 are comprised of two different sets of polygons, here rectangles that have a length and a width. The polygons of track 220 include rectangles with black edges and white interiors, the polygons of track 230 include rectangles with black edges and gray interiors. Each of these mappings of polygons may correspond to motion of a respective vehicle. Here the first vehicle is moving from a bottom part of FIG. 2A to an upper part of FIG. 2A along tack 220 as indicated by the arrowed line located within polygons of track 220. The second vehicle is moving from the left to the right of FIG. 2A as indicated by the arrowed lines withing the polygons of track 230.

Interaction 210 of FIG. 2A could be associated with vehicle motion with different characteristics. For example, the first vehicle could have the right of way and be moving at a speed that is greater than a speed initially associated with the second vehicle. Here the second vehicle may have stopped at a stop sign as the first vehicle approaches an intersection where tracks 220 and 230 overlap. Alternatively, the two different tracks of interaction 210 may correspond to the motion of two vehicles that both stop at an all way stop (i.e. a four way stop). The two different tracks of interaction 210 may only be relevant when a timing between movement of the first vehicle and the second vehicle moving though the point of intersection are close enough to make a driver of the first or the second vehicle yield to movement of the other vehicle. The second vehicle moving quickly in one direction may result in the first vehicle pausing. Here the second vehicle may simply continue at its current speed. The timing window of such an interaction is relatively short and because of this a timing window associated with this interaction may be small.

In an instance where the two vehicles of interaction 210 are at a four way stop, each vehicle may stop at an intersection before proceeding through the intersection. Rules of an all way stop dictate that all vehicles must stop at the intersection and yield right of way to a vehicle that first arrived at the intersection. In instances when two vehicles arrive at a same time, a vehicle located to the right of another vehicle has the right of way. While a controller of an automated vehicle (AV) may be programmed to follow the rules, drivers of other vehicles may not follow these rules. In such instances, a controller of an AV following the rules could make a decision to enter the intersection when a vehicle that violated the rules is also entering the intersection, resulting in a collision. Real world data collected from vehicles driven by people could be provided to a machine learning process to improve operation of the AV such that the collision could be avoided. This is because data from such an interaction could be used to train a controller of an automated vehicle (AV) to yield instead of asserting a right of way. Since interactions at an all way stop have a different timing of higher-speed interactions, slower speed interactions may be associated with larger time windows that higher-speed interactions.

Figure 2B:
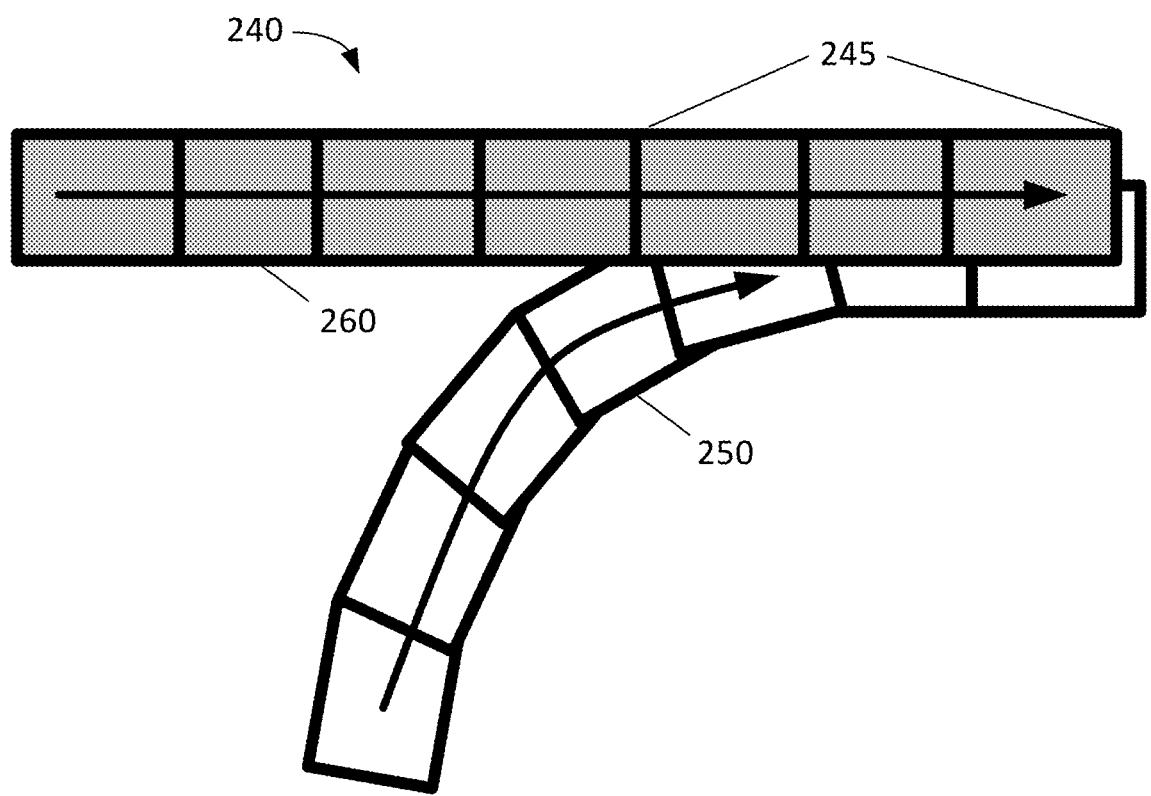
FIG. 2B illustrates a second track associated with a second type of vehicle interaction, in accordance with some aspects of the present technology.

FIG. 2B illustrates a second track associated with a second type of vehicle interaction. The second interaction 240 of FIG. 2B where a track 250 of a first vehicle overlaps with a track 260 of a second vehicle. Here instead of the different vehicle tracks overlapping at a single location, these tracks overlap at a span 245 of locations. Here again the different tracks are represented by rectangles that are either filled with a white color or with a gray color. This second interaction may be classified as a "right turn with cross-traffic" type of interaction or may represent a vehicle merging onto a highway. Here the first vehicle moves along the rightward curved arrowed line located inside of the track 250 and the second vehicle moves from the left side of FIG. 2B toward the right side of FIG. 2B along the arrowed line of track 260.

Interaction 240 may be associated with one vehicle moving at a faster speed and another vehicle is moving at a slower speed. An example of such an interaction includes the first vehicle moving at a higher speed when another vehicle is accelerating to highway speed. Alternatively, interaction 240 may be associated with a slower speed interaction (e.g. an all way stop). Here again, time windows associated with particular interaction types may be of different durations, high speed interactions have shorter time interaction time windows than slower speed interactions. In certain instances, a time window may be adjusted when two vehicles move in a same direction, here a smaller difference in relative vehicle speeds may correspond to a larger time window and a larger different in relative vehicle speeds may correspond to a smaller time window.

Time windows of the interactions of FIG. 2 may be used to identify specific interactions that are most useful to train a controller of an automated vehicle (AV). Since types of interactions and relative vehicle speeds both affect which time windows are relevant for training a machine (i.e. machine learning—ML process), each specific type of interaction may be assigned attributes or sub-classifications under a higher-level classification. A higher-level classification and these attributes or sub-classifications may each be assigned a label and a plurality of labels may be used as part of a data mining process that identifies specific data sets that can and/or should be used to train the ML process or a controller of an AV. Types of objects or vehicles may also be categorized and categories of objects may be associated with interaction types and/or classifications. Here types of objects may be placed into categories of car, truck, vehicle, bicycle, or pedestrian. Classifications and sub-classifications of interactions may include, yet not be limited to "turning left across traffic," "all way stop," "merging onto a highway," or "lane change," for example. In certain instances, both categories relating to a type of object and a type of interaction may be used to filter acquired data into data sets.

Another type of interaction may be associated with two vehicles that encounter each other along a portion of roadway too narrow for two vehicles to pass. When these two vehicles approach the narrow area of the road, one vehicle must yield to the other such that a collision may be avoided. This may include one vehicle stopping in a wider area of the road while another vehicle moves through the narrow area of the road or may include one vehicle pulling into a turn out to allow the other vehicle to proceed through the narrow area.

All of the data associated with the interactions that are mined for relevant interactions may have been collected by computers at vehicles that are driven by people. These vehicles may include sensors that allow the computers to collect data used to identify types of interactions, speeds, and/or relative speeds of vehicles. This collected data may include thousands or millions of interactions collected over time. In order to mine this data, a processor executing instructions out of the memory may identify types of interactions, may evaluate relative timings of vehicles that had encountered each other during these types of interactions, and may assign labels (i.e. classifications) and sub-labels (i.e. sub-classifications) to each encounter. Encounters that meet certain sets of criterion may be used to classify specific encounters as types of interactions that will be relevant to an ML process. This may include identifying relevant interactions by evaluating combinations of labels assigned to each previously recorded encounter.

Figure 3:
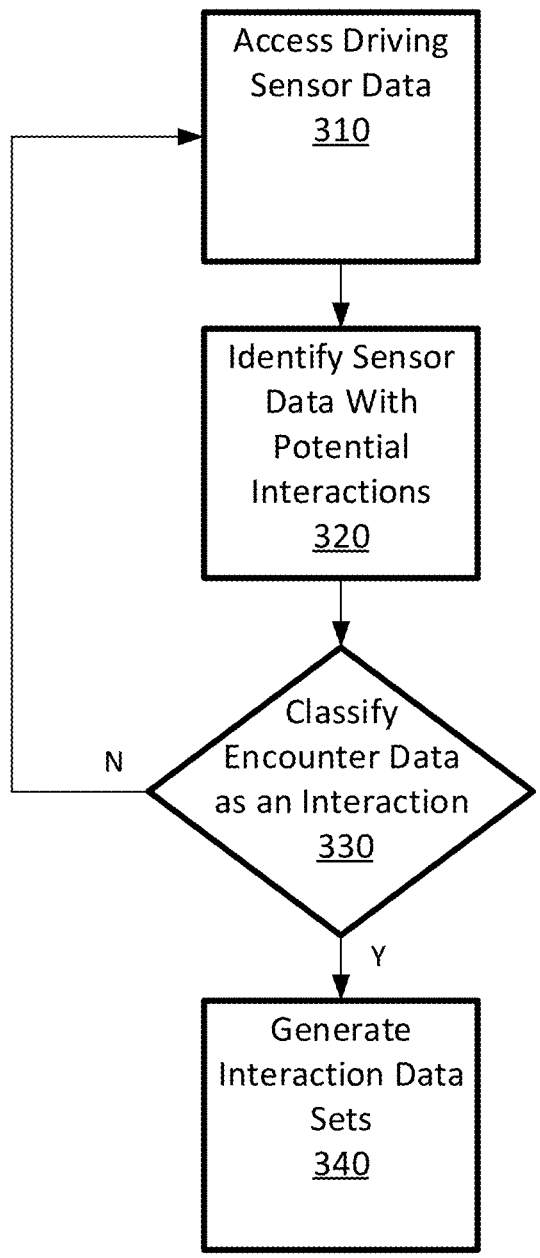
FIG. 3 illustrates steps of an example process that may be performed when vehicle interaction data is collected and initially evaluated, in accordance with some aspects of the present technology.

FIG. 3 illustrates a set of steps that may be performed when vehicle interaction data is collected and initially evaluated. FIG. 3 begins with step 310 where sensor previously received sensor data is accessed. This sensor data may include multiple streams of data from multiple types of sensors such as radar, camera, or light detecting and ranging (LiDAR) sensors is accessed. This data may have been collected from vehicles as they drive down a roadway. Data sets from thousands of driving sessions and millions driving encounters with other vehicles may be accessed and classified over time into categories and sub-categories using labels. The sensor data accessed in step 310 may correspond to data that associates locations of vehicles and vehicle mappings discussed in respect to FIG. 2.

Next in step 320, a recorded set of data may be reviewed to identify whether it includes encounters with other vehicles that may be classified as an interaction likely to be relevant to a ML learning process. Encounters that meet certain sets of criteria may be used to classify specific encounters as types of interactions that will be relevant to an ML process. Next, determination step 330 may determine whether the data identified in step 320 should be classified as an interaction, when no program flow may move back to step 310 where additional driver sensor data is accessed. When step 330 determines that the data identified in step 320 should be classified as an interaction, program flow may move to step 340 where an interaction data set is generated. This may include making evaluations that result in labels and possibly sub-labels being assigned to the data set generated in step 340.

Figure 4:
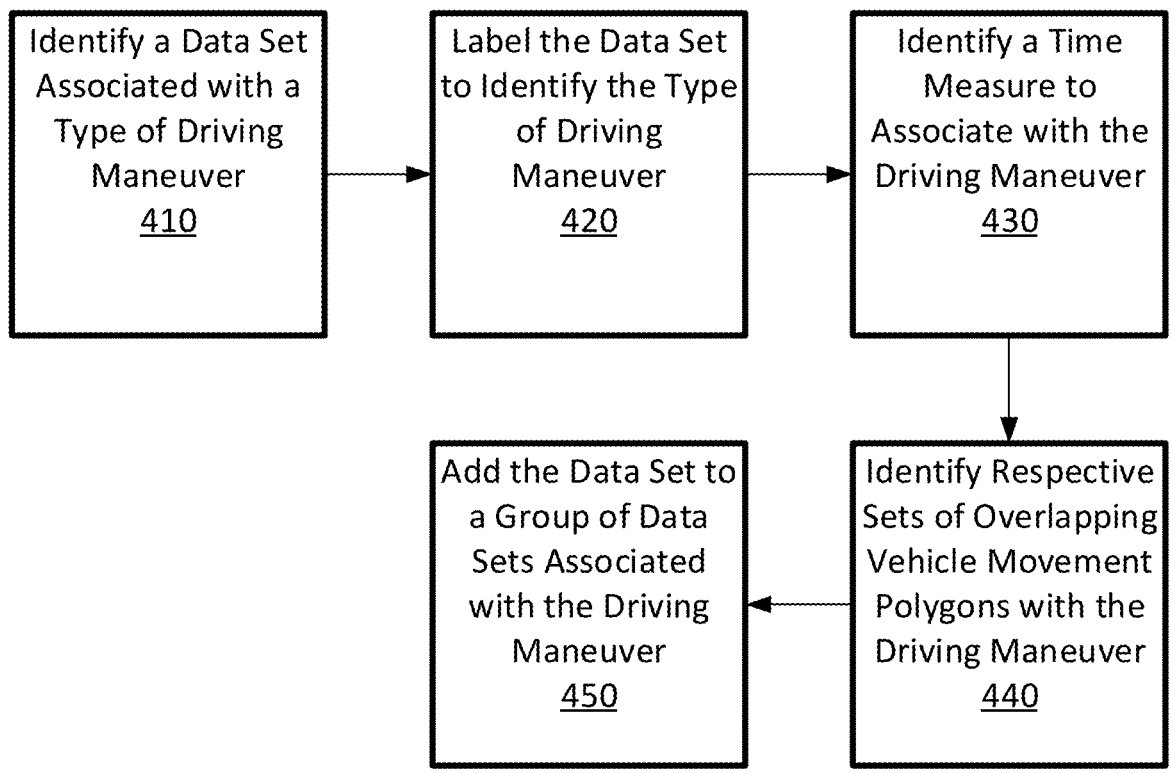
FIG. 4 illustrates steps of an example process for evaluating and classifying data), in accordance with some aspects of the present technology.

FIG. 4 illustrates a series of steps that may be performed when a set of vehicle interaction data is evaluated and classified. The steps of FIG. 4 may be evaluated by a processor executing instructions out of a memory. In step 410 of FIG. 4, the processor may identify a data set that is associated with a type of driving maneuver. As discussed above, there may be many different types of driving maneuvers classified by a processor executing instructions out of a memory. Then evaluations perform in step 420 may result in the data set be labeled with an "left turn across oncoming traffic" label. The processor may then identify times associated with the driving maneuver and these times may be added to the data set as one or more labels or other form of metadata in step 430. These measures of time could be on the order of less than a second, to some number of seconds, to twenty or more seconds.

Mappings of overlapping data sets may then be generated in step 440 of FIG. 4, these mappings may associate polygons that represent motion of a vehicle. One mapping of polygons may correspond to the motion of a first vehicle and another mapping of polygons may correspond to the motion of a second vehicle. These mappings may overlap like those polygon mappings discussed in respect to FIG. 2. After the mappings of the polygon tracks have been generated, the data set of this set of interactions may be added to a group of data sets that share one or more labels. For example, each of the data sets may be labeled as "left turn across oncoming traffic" may be classified into a group. Multiple labels may be used to group interactions into a combined set of interactions that may be provided to a machine learning process. A number of labels may include "left turn across oncoming traffic," a minimal differential vehicle speed, a size of a time window, or other labels. For example, "left turn across oncoming traffic" may be combined with a label of "all way stop." Alternatively, "left turn across oncoming traffic" may be combined with a label of "high-speed interaction."

Figure 5:
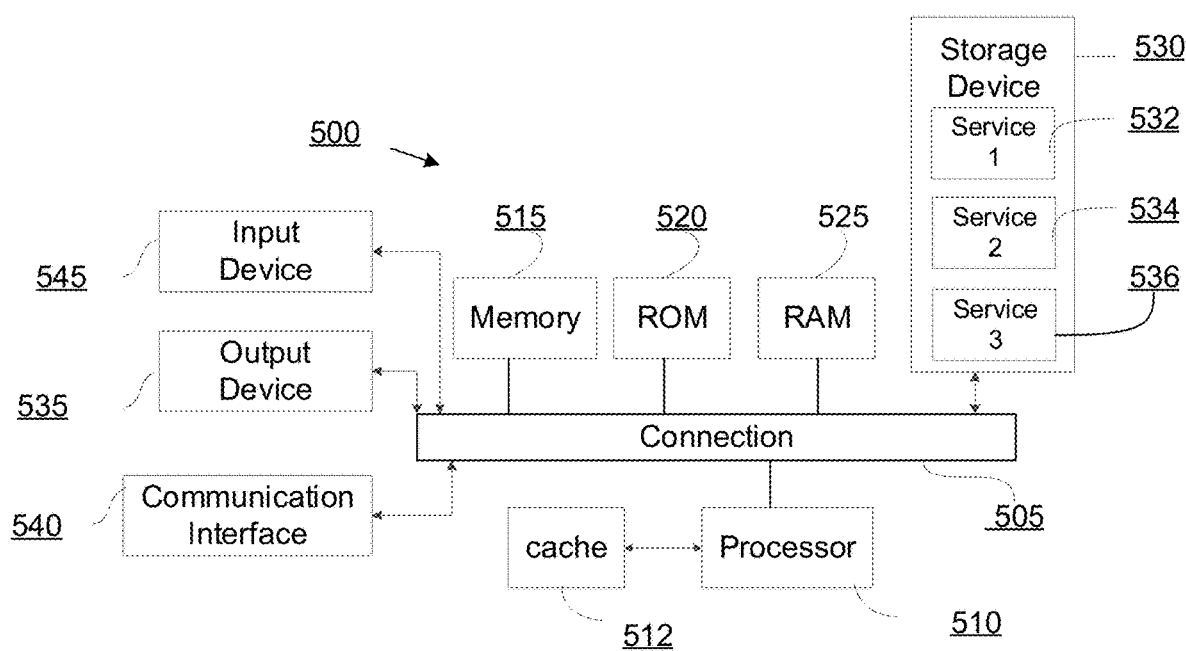
FIG. 5 shows an example of computing system that may be used to implement at least some of the functions reviewed in the present disclosure in accordance with some aspects of the present technology.

FIG. 5 shows an example of computing system 500 that may be used to implement at least some of the functions reviewed in the present disclosure. In certain instances, a computing device may be incorporated into a sensing apparatus or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 542, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

What is claimed is:

1. An apparatus that organizes data, the apparatus comprising:
   a memory; and
   a processor that executes instructions out of the memory to:
   identify a set of data to associate with a driving maneuver of a first vehicle;
   label the data set with a label identifying the driving maneuver;
   identify a measure of time associated with the driving maneuver;
   mine the data set for an interaction between the first vehicle and a second vehicle, wherein the interaction is detected by identifying a first set of polygons associated with the first vehicle performing the driving maneuver overlap with a second set of polygons associated with motion of the second vehicle within the measure of time associated with the driving maneuver;
   upon detecting the interaction, generating a mapping between the data set and a group of data sets, wherein the mapping is based on the overlapping of the first set of polygons associated with the first vehicle and the second set of polygons associated with the second vehicle, wherein each data set of the group of data sets are also associated with respective sets of overlapped polygons associated with the first driving maneuver within respective times that correspond to the measure of time; and
train a controller algorithm of an automated vehicle (AV) based upon the overlapping portions of the first and second polygons within the measure of time.

2. The apparatus of claim 1, further comprising:
operating, by the controller algorithm, a mechanical system of the AV, wherein the mechanical system includes at least one of a propulsion system, a braking system, and a steering system.

3. The apparatus of claim 1, wherein a set of combined driving conditions are selected from a group of a left turn across traffic moving in a direction different from the first vehicle, a left turn at an all way stop, a left turn crossing oncoming traffic, a right turn at an all way stop, a right turn in a a direction that corresponds to oncoming traffic, forward motion at an all way stop, forward motion with cross traffic, and forward motion along a narrow roadway.

4. The apparatus of claim 1, further comprising:
associating one or more additional labels with the first driving maneuver.

5. The apparatus of claim 4, wherein the labels and the one or more additional labels identify a set of combined driving conditions.

6. The apparatus of claim 1, wherein the driving maneuver corresponds to a merging of traffic.

7. A method for organizing data, the method comprising:
identifying a set of data to associate with a driving maneuver of a first vehicle;
labeling the data set with a label indicative of the label of the driving maneuver;
identifying a measure of time associated with the driving maneuver;
mining the data set for an interaction between the first vehicle and a second vehicle, wherein the interaction is detected by identifying a first set of polygons associated with the first vehicle performing the driving maneuver overlap with a second set of polygons associated with motion of the second vehicle within the measure of time associated with the driving maneuver;
upon detecting the interaction, generating a mapping between the data set and a group of data sets, wherein the mapping is based on the overlapping of the first set of polygons associated with the first vehicle and the second set of polygons associated with the second vehicle, wherein each data set of the group of data sets are also associated with respective sets of overlapped polygons associated with the driving maneuver within respective times that correspond to the measure of time; and
training a controller algorithm of an automated vehicle (AV) based upon the overlapping portions of the first and second polygons within the measure of time.

8. The method of claim 7, further comprising:
operating, by the controller algorithm, a mechanical system of the AV, wherein the mechanical system includes at least one of a propulsion system, a braking system, and a steering system.

9. The method of claim 7, wherein a set of combined driving conditions are selected from a group of a left turn across traffic moving in a direction different from the first vehicle, a left turn at an all way stop, a left turn crossing oncoming traffic, a right turn at an all way stop, a right turn in a direction that corresponds to oncoming traffic, forward motion at an all way stop, forward motion with cross traffic, and forward motion along a narrow roadway.

10. The method of claim 7, further comprising associating one or more additional labels with the driving maneuver.

11. The method of claim 10, wherein the labels and the one or more additional labels identify a set of combined driving conditions.

12. The method of claim 7, wherein the traffic driving maneuver corresponds to a merging of traffic.

13. The method of claim 7, wherein the traffic driving maneuver corresponds to a lane change.

14. The method of claim 7, further comprising:
generating the first set of polygons based on areas that the first vehicle moves during the measure of time; and
generating the second set of polygons based on zones where the second vehicle moves during the measure of time.

15. A non-transitory computer-readable storage medium having embodied thereon a program for implementing a method for organizing data, the method comprising:
identifying a set of data to associate with a driving maneuver of a first vehicle;
labeling the data set with a label indicative of the label of the driving maneuver;
identifying a measure of time associated with driving maneuver;
mining the data set for an interaction between the first vehicle and a second vehicle, wherein the interaction is detected by identifying a first set of polygons associated with the first vehicle performing the driving maneuver overlap with a second set of polygons associated with motion of the second vehicle within the measure of time associated with the driving maneuver;
upon detecting the interaction, generating a mapping between the data set and a group of data sets, wherein the mapping is based on the overlapping of the first set of polygons associated with the first vehicle and the second set of polygons associated with the second vehicle, wherein each data set of the group of data sets are also associated with respective sets of overlapped polygons associated with the driving maneuver within respective times that correspond to the measure of time; and
train a controller algorithm of an automated vehicle (AV) based upon the overlapping portions of the first and second polygons within the measure of time.

16. The non-transitory computer-readable storage medium of claim 15, the method further comprising:
operating, by the controller algorithm, a mechanical system of the AV, wherein the mechanical system includes at least one of a propulsion system, a braking system, and a steering system.

17. The non-transitory computer-readable storage medium of claim 16, wherein a set of combined driving conditions are selected from a group of a left turn across traffic moving in a direction different from the first vehicle, a left turn at an all way stop, a left turn crossing oncoming traffic, a right turn at an all way stop, a right turn in a direction that corresponds to oncoming traffic, forward motion at an all way stop, forward motion with cross traffic, and forward motion along a narrow roadway.

18. The non-transitory computer-readable storage medium of claim 15, further comprising associating one or more additional labels with the driving maneuver.

19. The non-transitory computer-readable storage medium of claim 17, wherein the labels and the one or more additional labels identify a set of combined driving conditions.

20. The non-transitory computer-readable storage medium of claim 15, wherein the driving maneuver corresponds to a merging of traffic.

* * * * *